United States Patent
Shimizu

(10) Patent No.: US 7,891,269 B2
(45) Date of Patent: Feb. 22, 2011

(54) STRADDLE TYPE VEHICLE

(75) Inventor: Masafumi Shimizu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 274 days.

(21) Appl. No.: 12/188,946

(22) Filed: Aug. 8, 2008

(65) Prior Publication Data

US 2009/0038432 A1 Feb. 12, 2009

(30) Foreign Application Priority Data

Aug. 10, 2007 (JP) ............................. 2007-210266

(51) Int. Cl.
*B62K 21/12* (2006.01)
(52) U.S. Cl. .................................... 74/551.8
(58) Field of Classification Search ................ 74/551.1, 74/551.8, 558.5; 180/90; 280/288.4; 114/55.5, 114/55.52, 144 R, 169; 16/421
See application file for complete search history.

(56) References Cited

U.S. PATENT DOCUMENTS

| 692,383 | A | * | 2/1902 | Tarzian | ...................... 74/551.3 |
| 3,204,481 | A | * | 9/1965 | Golden | ...................... 74/551.1 |
| 6,581,709 | B2 | * | 6/2003 | Tsuji | ............................ 180/90 |
| 6,616,165 | B2 | * | 9/2003 | Tsuji | ....................... 280/288.4 |
| 7,017,507 | B2 | * | 3/2006 | Hattori et al. | ............ 114/144 R |
| 2004/0045395 | A1 | * | 3/2004 | Chen | ........................ 74/551.8 |

FOREIGN PATENT DOCUMENTS

JP 2005-119392 5/2005

* cited by examiner

*Primary Examiner*—Vicky A Johnson
(74) *Attorney, Agent, or Firm*—Keating & Bennett, LLP

(57) ABSTRACT

A vehicle includes a handlebar and a handlebar cover. The handlebar cover includes a front cover for covering a front side of the handlebar and a rear cover for covering a rear side of the handlebar. The front and rear covers are fastened to each other by a fastener member. The fastener member is covered by a cover attached to the handlebar cover.

11 Claims, 8 Drawing Sheets

FRONT ←——————→ REAR

FRONT ←——→ REAR

FRONT ←——————→ REAR

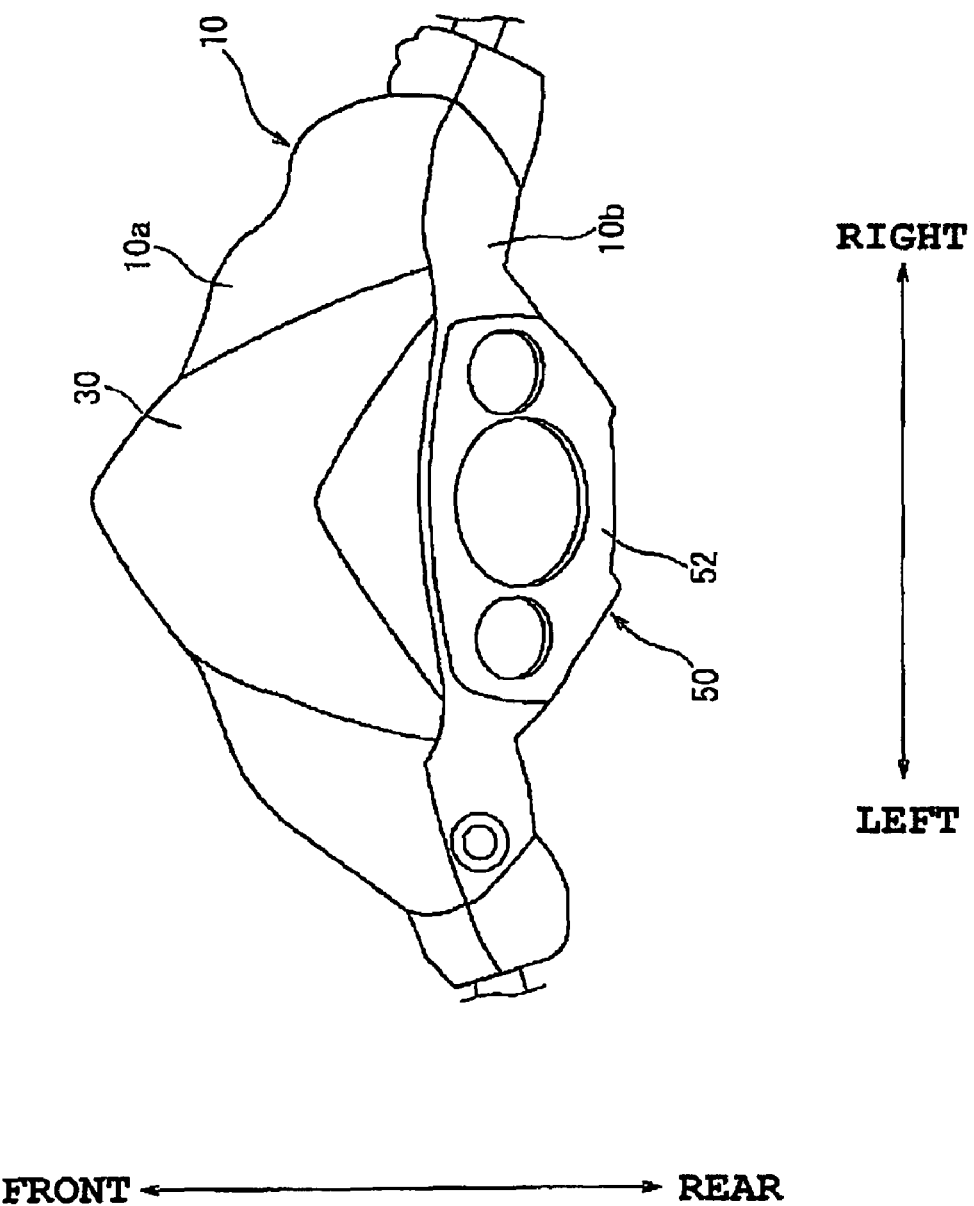

STRADDLE TYPE VEHICLE

RELATED APPLICATIONS

This application claims the benefit of priority under 35 USC 119 of Japanese patent application no. 2007-210266, filed on Aug. 10, 2007, which application is hereby incorporated by reference in its entirety.

BACKGROUND OF THE INVENTION

1. Field of the Invention

The present invention relates to a vehicle having a handlebar, and in particular, relates to a straddle-type vehicle including a handlebar cover.

2. Description of Related Art

In general, in a straddle-type vehicle, a meter unit including a speedometer and the like is attached to a handlebar. For example, in JP-A-2005-119392, a handlebar cover for covering the handlebar and a meter unit are integrally assembled. The handlebar cover in JP-A-2005-119392 includes a front cover for covering the handlebar from the front and a rear cover for covering the handlebar from the rear that are mated with each other and joined together with a screw. The meter unit is fitted to an opening formed on top of the rear cover.

However, in the handlebar cover disclosed in JP-A-2005-119392, the screw is exposed to the outside and therefore has insufficient protection. For example, rainwater may collect around the screw and cause the screw to rust. In addition, because the screw is fastened from a rear cover side, the space for a meter display (such as a speedometer display) in the rear cover is decreased. A large space for the meter display is preferable from a viewpoint of visibility so that a rider who moves his/her attention to the meter display can immediately recognize a vehicle state.

SUMMARY OF THE INVENTION

The present invention addresses this point and provides a vehicle with protection of a fastener member for fastening a handlebar cover.

A vehicle of the present invention includes a handlebar and a handlebar cover for covering the handlebar. The handlebar cover comprises a front cover for covering a front side of the handlebar and a rear cover for covering a rear side of the handlebar. The front cover and the rear cover are fastened to each other by a fastener member. The fastener member is covered by a cover attached to the handlebar cover.

With the vehicle of the present invention, the fastener member for fastening the front and rear covers is covered. Therefore, exposure of the fastener member to the outside of the handlebar cover is avoided, and consequently, the fastener member is protected. Collection of rainwater around the fastener member and consequent rust of the fastener member are thereby avoided.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 8 is a top schematic view of the surroundings of the handlebar.

DETAILED DESCRIPTION OF THE INVENTION

Figure 1:
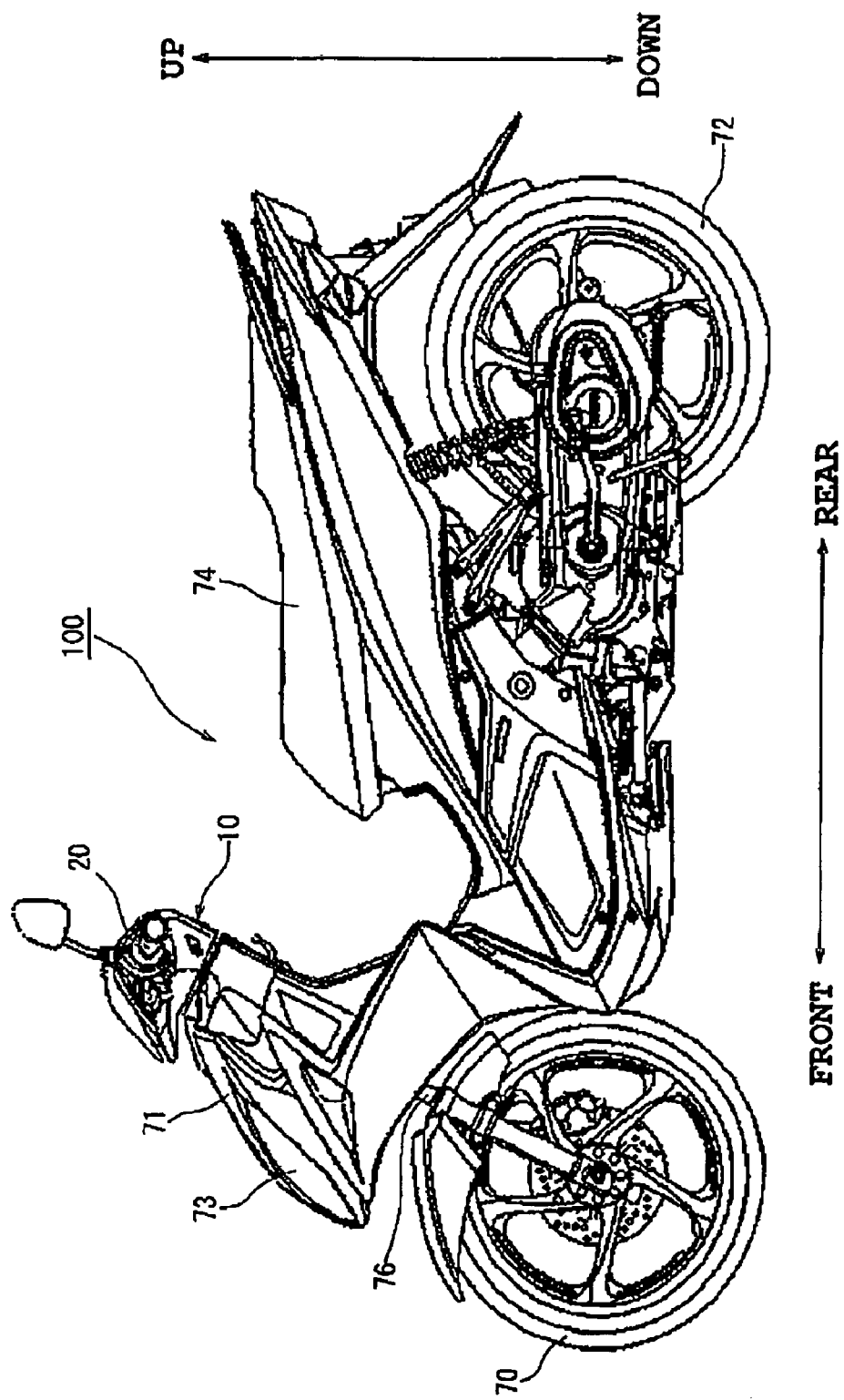
FIG. 1 is an external side view of a straddle-type vehicle according to the present invention.

An embodiment of the present invention is now described with reference to the drawings. In the drawings, the same reference numerals are given to members and parts having the same functions. It should be understood that the present invention is not limited to the embodiment described below.

A straddle-type vehicle 100 according to an embodiment of the present invention is described with reference to FIG. 1. FIG. 1 is a side view of straddle-type vehicle 100. In the following description, directions are indicated from the perspective of a rider on vehicle 100. Front and rear directions are defined by a traveling direction of vehicle 100, the rider's left and right are left and right directions, and a vertical direction includes the up and down directions.

Straddle-type vehicle 100 of this embodiment is a so-called underbone-type motorcycle. Vehicle 100 includes a front wheel 70 that interlocks with a handlebar 20 to be rotatable and a rear wheel 72 driven by power of an engine. A seat 74 is disposed at the center of vehicle 100, and handlebar 20 is disposed in front of seat 74.

Front forks 76 extend downward to the front from handlebar 20 and support front wheel 70. Front forks 76 absorb shocks from a road surface. The engine is disposed between front wheel 70 and seat 74 and drives rear wheel 72. Front wheel 70 is maneuvered by handlebar 20 attached to top ends of front forks 76. A handlebar cover 10 covers a central portion of handlebar 20.

Figure 2:
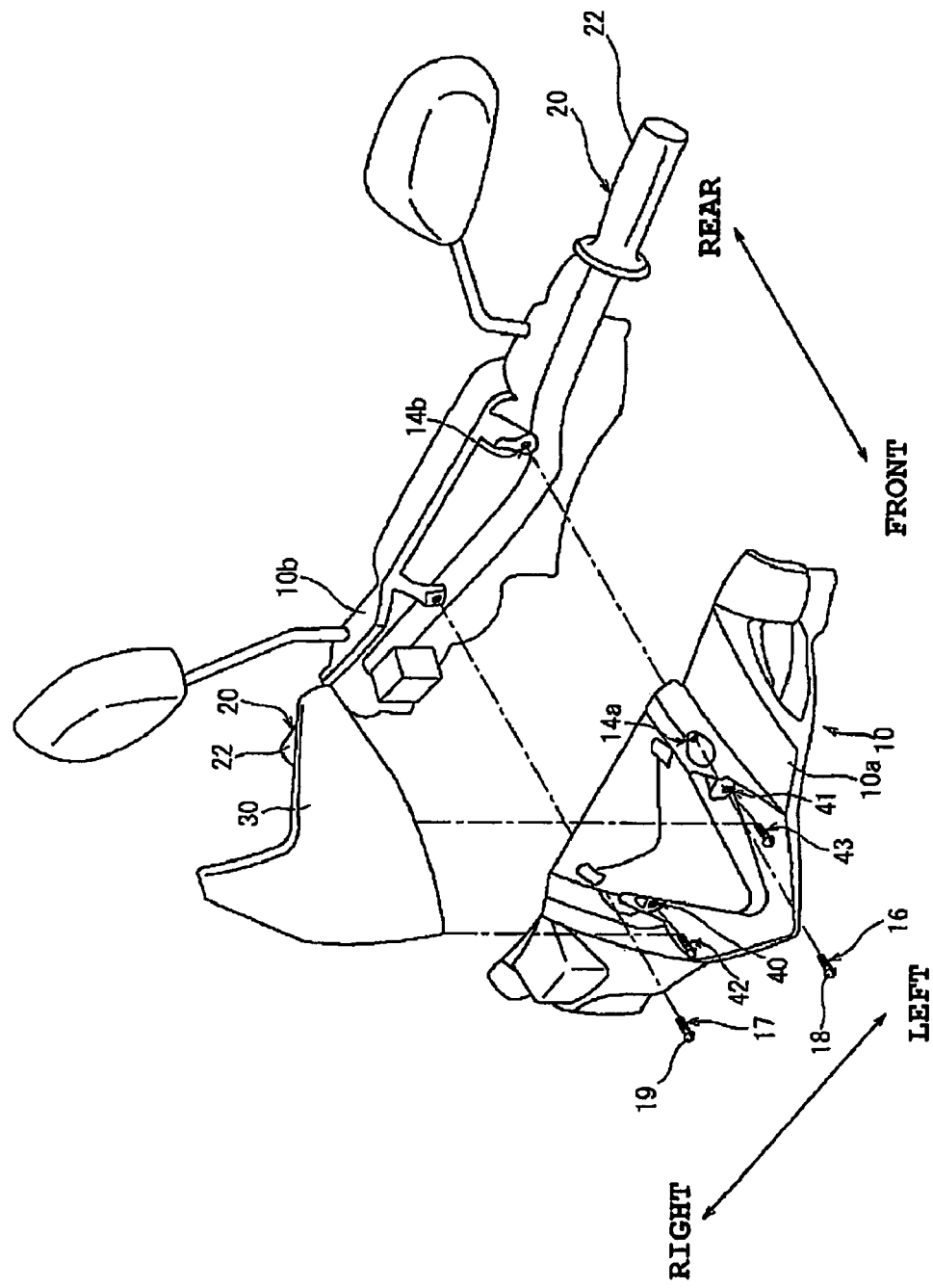
FIG. 2 is a exploded perspective view illustrating surroundings of a handlebar of the straddle-type vehicle.
Figure 3:
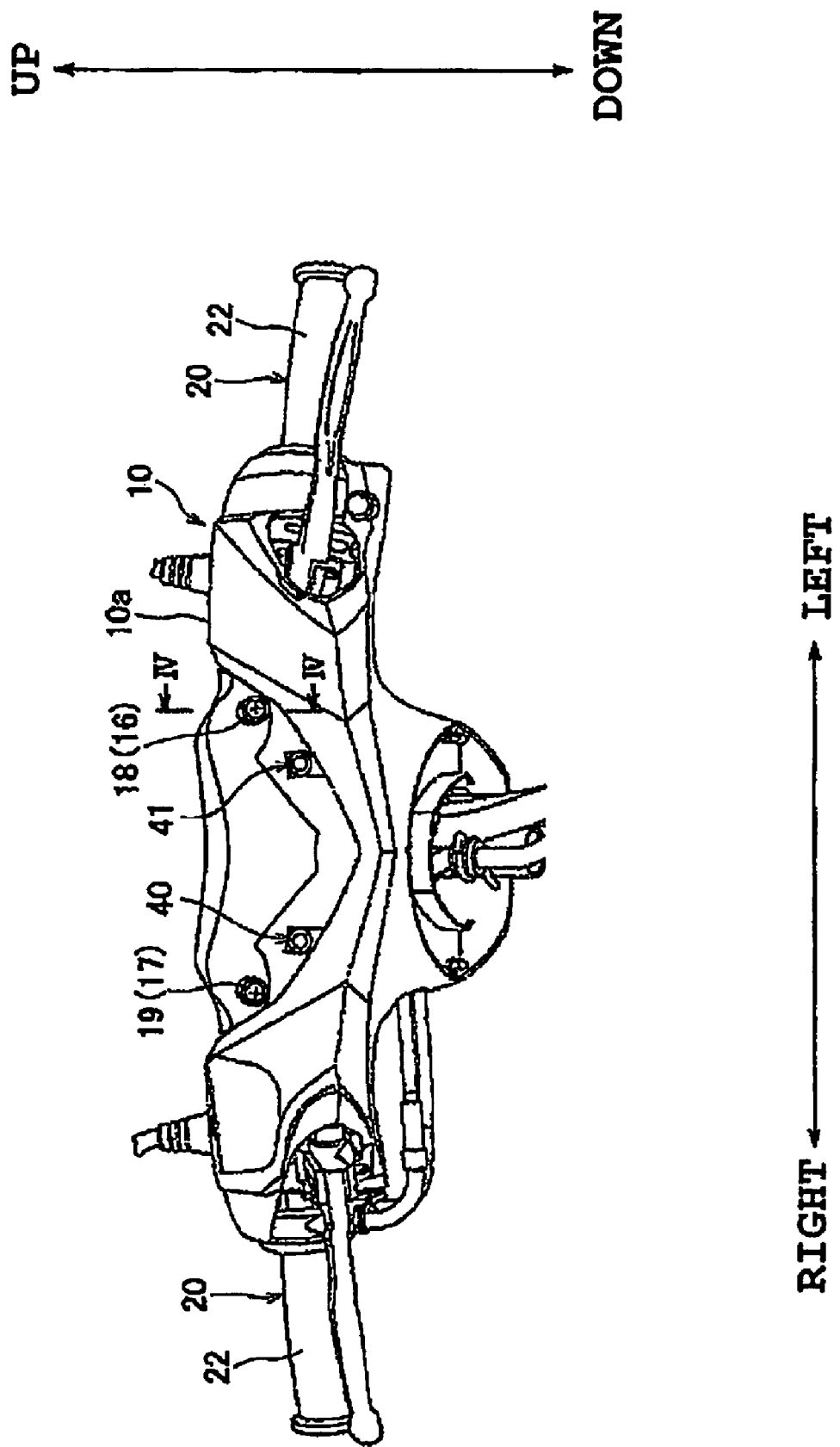
FIG. 3 is a schematic front view of the surroundings of the handlebar with a cover removed.
Figure 4:
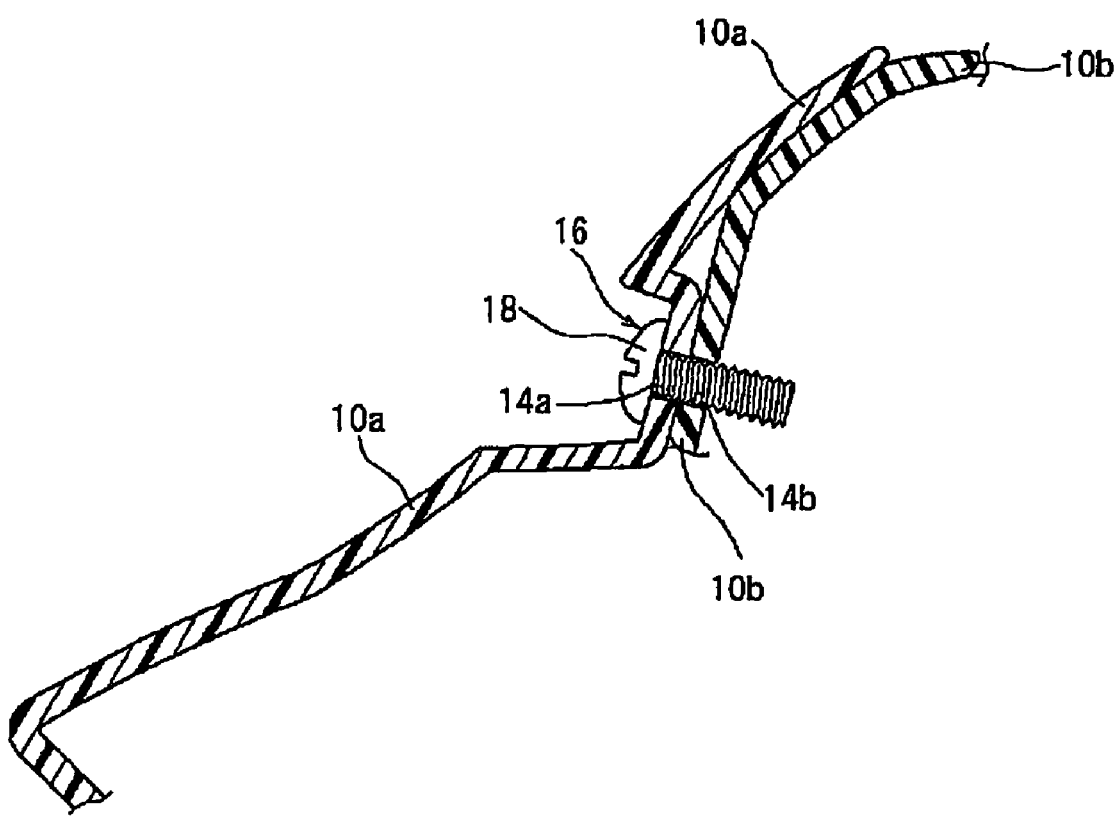
FIG. 4 is a cross-sectional view taken along IV-IV of FIG. 3.

Handlebar cover 10 is described with reference to FIGS. 2-4. FIG. 2 is an exploded perspective view illustrating surroundings of handlebar 20, and FIG. 3 is a schematic front view of the surroundings of handlebar 20 with a cover removed. FIG. 4 is a cross-sectional view taken along IV-IV of FIG. 3.

Handlebar cover 10 covers the central portion of handlebar 20 and is segmented into front and rear parts. That is, as shown in FIG. 2, handlebar cover 10 is configured by assembling a front cover 10a and a rear cover 10b that are segmented into the front and the rear parts.

Front cover 10a is a handlebar cover member disposed in a front side and constitutes generally a front half of handlebar cover 10. In this embodiment, front cover 10a extends in a left-and-right direction and covers the front central portion of handlebar 20 except grip portions 22. Rear cover 10b is a handlebar cover member disposed in a rear side and constitutes generally a rear half of handlebar cover 10. In this embodiment, rear cover 10b extends in the left-and-right direction and covers the rear central portion of handlebar 20 except grip portions 22.

Front cover 10a and rear cover 10b are fastened to each other by two fastener members 16, 17. Fastener members 16, 17 are, for example, screws. As shown in FIGS. 2 and 3, front cover 10a and rear cover 10b are screwed together via screw 16 in a left side of handlebar cover 10 and screw 17 in a right side of handlebar cover 10. Disassembly of handlebar cover 10 is facilitated by screwing front cover 10a to rear cover 10b, thereby improving the maintainability of an inside of handlebar 20.

Screws 16, 17 are fastened in a longitudinal direction of vehicle 100 from a front cover 10a side. As shown in FIG. 4, screw holes 14a and 14b for screw 16 are respectively formed in front cover 10a and rear cover 10b. Screw 16 is inserted through screw holes 14a, 14b from the front cover 10a side in the longitudinal direction (a reverse direction of the traveling direction of the vehicle) and fastens covers 10a and 10b. Screw 17 is screwed in the longitudinal direction from the front cover 10a side in the same configuration as screw 16. As shown in FIGS. 3 and 4, screws 16, 17 are fastened in such a manner with their screw heads 18, 19 exposed on a front surface of front cover 10a.

Figure 5:
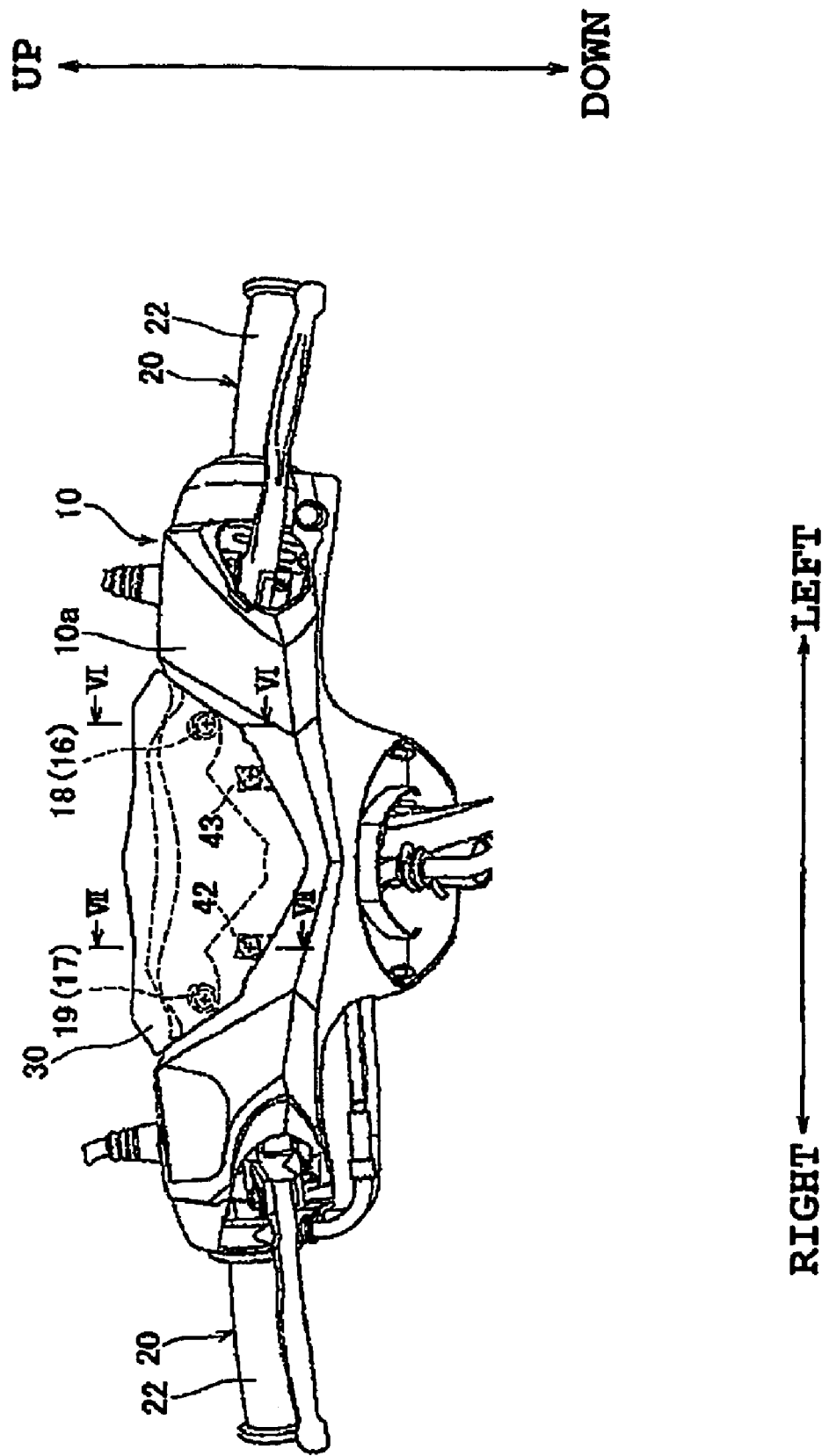
FIG. 5 is a schematic front view of the surroundings of the handlebar with a cover attached.
Figure 6:
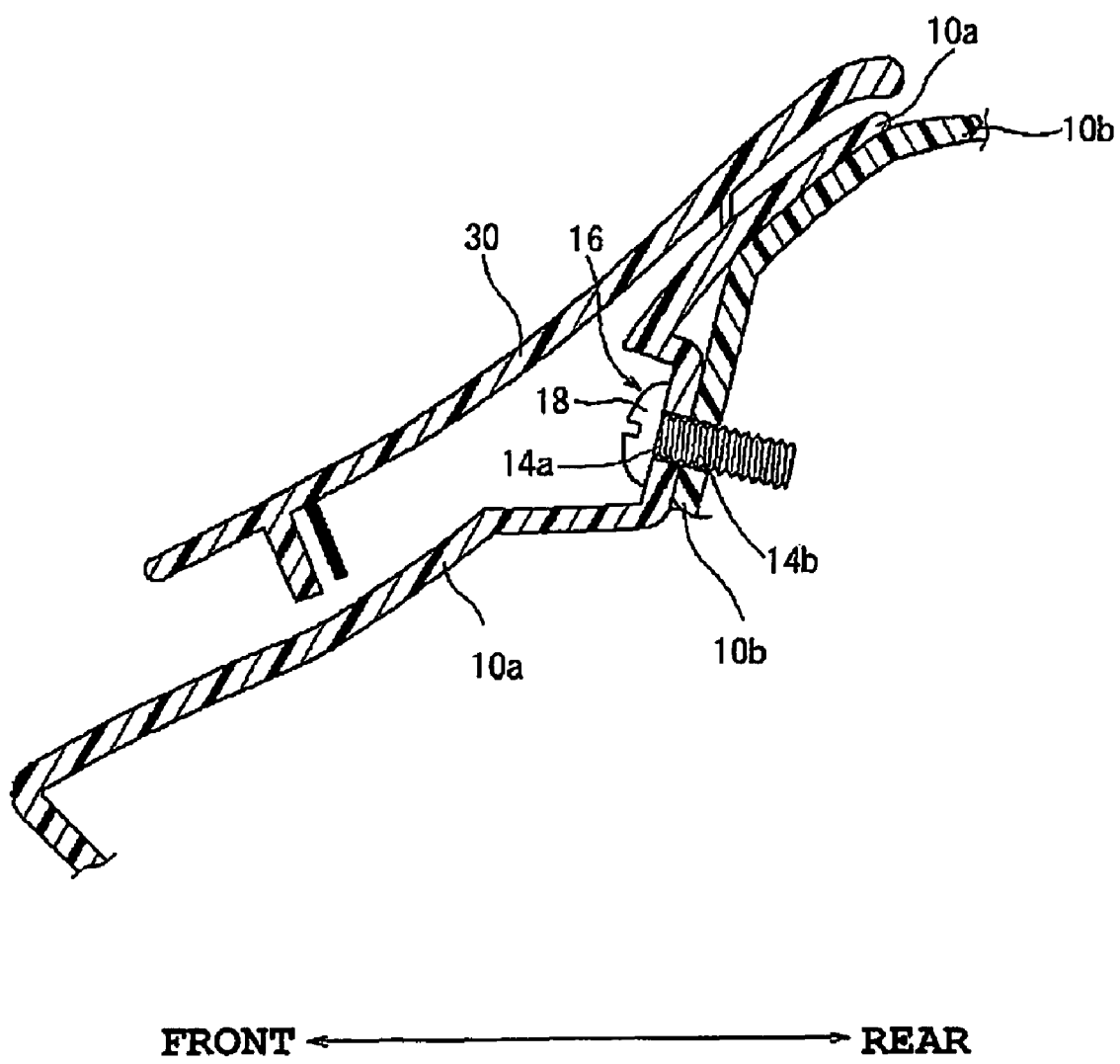
FIG. 6 is a cross-sectional view taken along VI-VI of FIG. 5.
Figure 7:
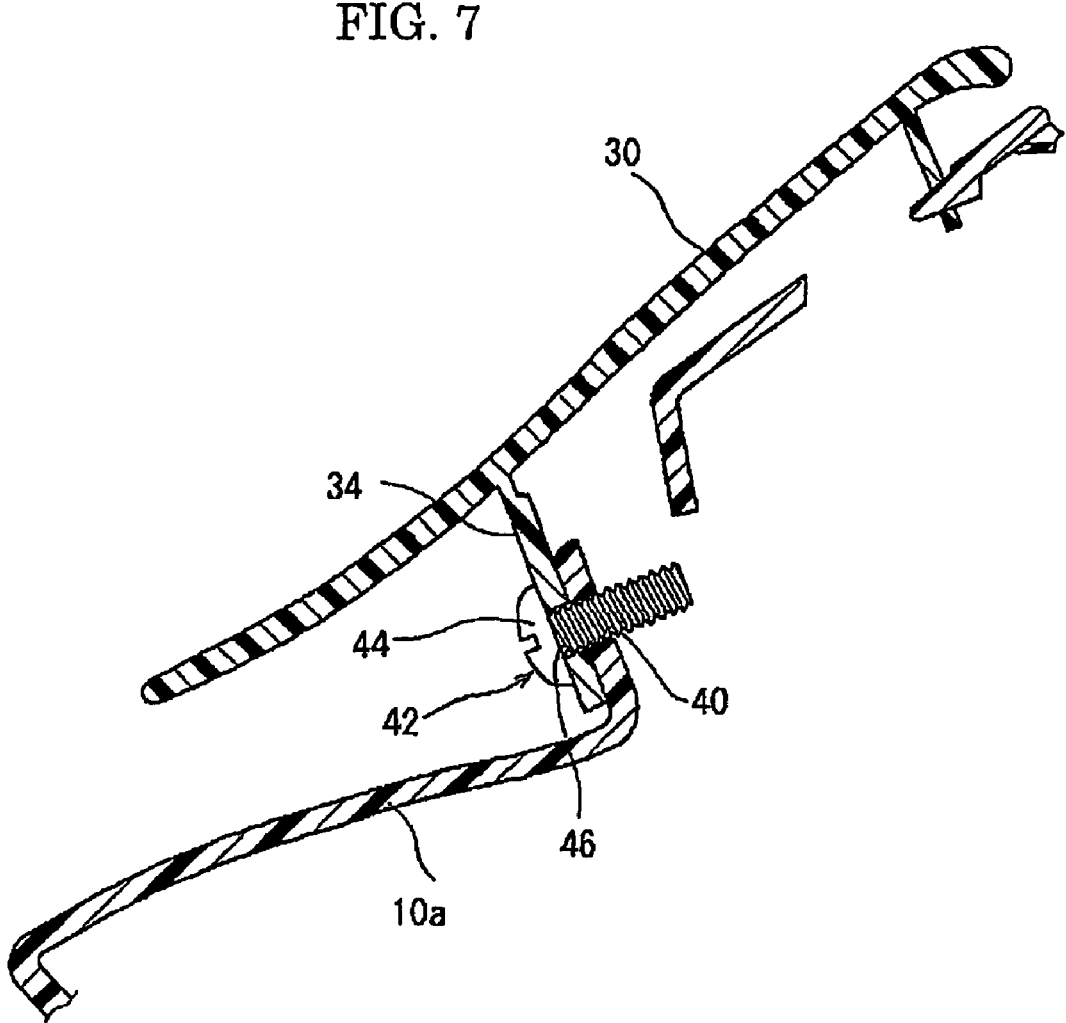
FIG. 7 is a cross-sectional view taken along VII-VII of FIG. 5.

A cover 30 is placed to cover screw heads 18, 19. FIGS. 5-7 show a condition where cover 30 is attached. FIG. 5 is a schematic front view showing the surroundings of handlebar 20 with cover 30 attached. FIG. 6 is a cross-sectional view taken along VI-VI of FIG. 5. FIG. 7 is a cross-sectional view taken along VII-VII of FIG. 5.

As shown in FIGS. 5 and 6, cover 30 is attached to cover screws 16, 17 exposed on an outer surface of handlebar cover 10 (especially, the front surface of front cover 10a). In this embodiment, cover 30 is a generally triangular plate member made of a resin material. Cover 30 can be of any shape as long as it covers screws 16, 17 exposed on the outer surface of handlebar cover 10. The shape of cover 30 can be modified according to the configuration of the handlebar cover (according to the fastening positions and number of screws, for example).

Screws 16, 17 for fastening front cover 10a and rear cover 10b are thereby covered by cover 30. Exposure of screws 16, 17 on the outer surface of handlebar cover 10 is thereby avoided, and screws 16, 17 are consequently protected from collection of rainwater and rust. In addition, in this embodiment, screws 16, 17 are fastened in the longitudinal direction of the vehicle from the front cover 10a side. Consequently, even when rainwater and the like enters inside cover 30, it is difficult for the rainwater to collect around screws 16, 17.

While the material for cover 30 is not limited in any way, an opaque material such as ABS resin is preferable. Here, the term "opaque" means a degree of opacity such that the inside of cover 30 is visually unrecognizable. With such a configuration, screws 16, 17 are covered to be invisible. Accordingly, the exterior appearance of the handlebar cover (consequently, the exterior appearance of vehicle 100) are improved, and consequently, merchantability is improved. Regardless of the material used for cover 30, cover 30 covers and protects fastening screws 16, 17. Therefore, cover 30 may be made of a translucent material (for example, polycarbonate, acrylic resin, or the like).

Cover 30 may be configured only to cover screws that need to be covered. Thus, cover 30 may be configured to cover all screws or to selectively cover only some screws. For example, cover 30 can be configured such that it selectively covers a screw fastened in a position where rainwater tends to collect (such as an exposed screw heading upward of the vehicle). Or, cover 30 can be configured such that it selectively covers a screw that is highly visible (for example, a screw exposed on the front surface of the front cover) in order to improve the exterior appearance of the handlebar cover.

Cover 30 may not only cover a cover fastening section, which is described above, but may also cover other components mounted around the handlebar. For example, as shown in FIG. 2, a brake master cylinder may be housed in the right side within handlebar cover 10. However, if a vehicle structure wherein a part of the brake master cylinder is exposed to the outside is adopted, cover 30 can be configured to cover the brake master cylinder.

Components around a brake handle can also be protected by cover 30, and thus can be prevented from being exposed. The shape of cover 30 can be modified in accordance with a layout of the components covered by cover 30. Cover 30 may have functions beyond improving the design or covering fastening section. For example, cover 30 may be in a screen shape and be utilized as a so-called visor.

In this embodiment, as shown in FIG. 2, cover 30 is screwed to front cover 10a through two screws 42, 43. As shown in FIG. 7, a rear surface of cover 30 has a projection 34 projecting obliquely downward, and screw holes 46, 40 for a screw 42 are respectively formed in projection 34 and front cover 10a. Screw 42 is inserted through screw holes 46, 40 in the longitudinal direction from a cover 30 side and fastens projection 34 and front cover 10a to each other. In this configuration, screw 42 is concealed behind cover 30, and exposure of a screw head of screw 42 is thereby avoided when seen from forward of the vehicle.

Other characteristics of handlebar cover 10 are described in detail with reference to FIG. 8, which is a top schematic view of the surroundings of handlebar 20.

As shown in FIG. 8, a meter unit 50 is fitted to an opening formed in the top of rear cover 10b. In order for the rider seated on the seat to have a better view, the opening opens obliquely upward to the rear. Meter unit 50 has a lens 52 at its top and various meter mechanisms including a speedometer are mounted therein. Lens 52 is a transparent member such that the inside of meter unit 50 is visually recognizable. Because screws 16, 17 for fastening front cover 10a and rear cover 10b are fastened from the screw cover 10a side, the fastening sections of screws 16, 17 are not exposed on a rear surface of rear cover 10b.

With such a configuration, compared to a handlebar cover with screws fastened from the rear cover 10b side, the opening in rear cover 10b can be enlarged due to a lack of exposure of the fastening sections of screws 16, 17. Accordingly, the housing space of meter unit 50 (especially, a display area of the meter) can be enlarged. As a result, a rider who moves his/her attention to the display area of the meter mounted in the handlebar cover can immediately recognize a vehicle state.

The present invention is not limited to a vehicle in which a rider straddles to sit on a seat, but also is applicable to a vehicle in which a rider is seated with his/her legs closed (typically, a scooter-type vehicle). In addition, in vehicle 100 as shown in FIG. 1, headlights 73 are installed on a cowling 71 disposed below and in front of handlebar cover 10; however, the structure is not limited to this. The headlights may be installed on the handlebar cover, for example. Moreover, the invention is not limited to an underbone-type motorcycle, and is also applicable to other straddle-type vehicles having a handlebar cover that can be segmented into a front and a rear parts. For example, the invention may be applied to four-wheel buggies (ATV: all terrain vehicles) and snowmobiles.

Although embodiments of the present invention have been described, these descriptions should not be construed as limitations and various modifications may be made thereto.

The present invention provides a straddle-type vehicle with protection of a fastener member for fastening a handlebar cover.

The invention claimed is:

1. A vehicle comprising:
   a handlebar including a front side and a rear side;
   a handlebar cover arranged to cover the handlebar, the handlebar cover including a front cover arranged to cover the front side of the handlebar and a rear cover arranged to cover the rear side of the handlebar;

at least one fastener member arranged to fasten the front cover to the rear cover, the at least one fastener member arranged to extend through an aperture in the front cover; and a cover arranged to cover the fastener member from a front of the vehicle.

2. The vehicle according to claim 1, wherein the at least one fastener member extends through a front surface of the front cover, and the cover is disposed on a front side of the at least one fastener member.

3. The vehicle according to claim 1, wherein the at least one fastener member extends in a longitudinal direction of the vehicle from a front surface of the front cover.

4. The vehicle according to claim 1, wherein the at least one fastener member is a screw.

5. The vehicle according to claim 1, wherein the cover is made of an opaque material.

6. The vehicle according to claim 1, wherein the rear cover includes an opening arranged to expose a meter unit at a top of the rear cover.

7. The vehicle according to claim 1, wherein the front cover is attached to the rear cover by a second fastener member, and the second fastener member is concealed by a surface of the cover.

8. The vehicle according to claim 7, wherein the cover includes a projection projecting obliquely downward from a rear surface of the cover, and the second fastener member extends through a hole in the projection.

9. The vehicle according to claim 1, wherein the vehicle is a straddle vehicle.

10. The vehicle according to claim 1, wherein the vehicle is an underbone motorcycle.

11. The vehicle according to claim 1, wherein the cover is arranged to cover at least a portion of a front surface of the front cover.

* * * * *